Sept. 24, 1935.  E. P. KINNE  2,015,313
TRACTOR TRAILER COUPLING DEVICE
Filed May 14, 1932  11 Sheets-Sheet 2
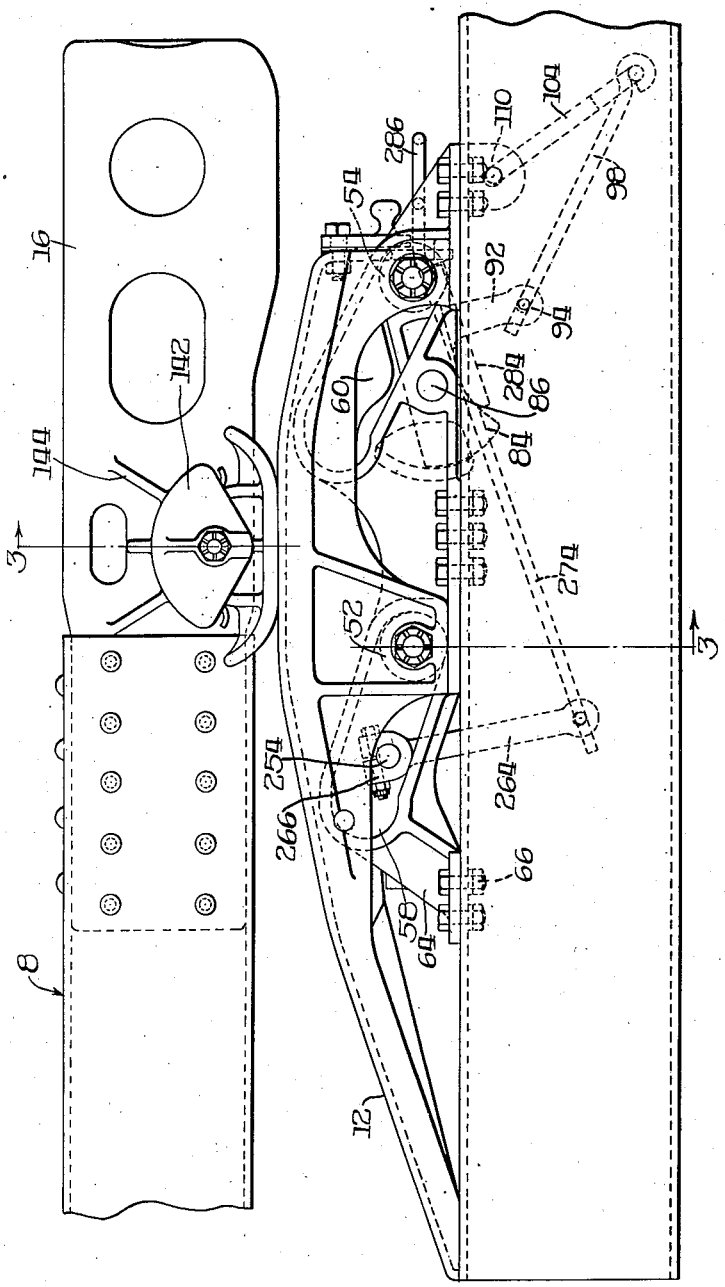
Inventor:
Edmund P. Kinne
By Wilkinson, Huxley, Byron & Knight
Attys

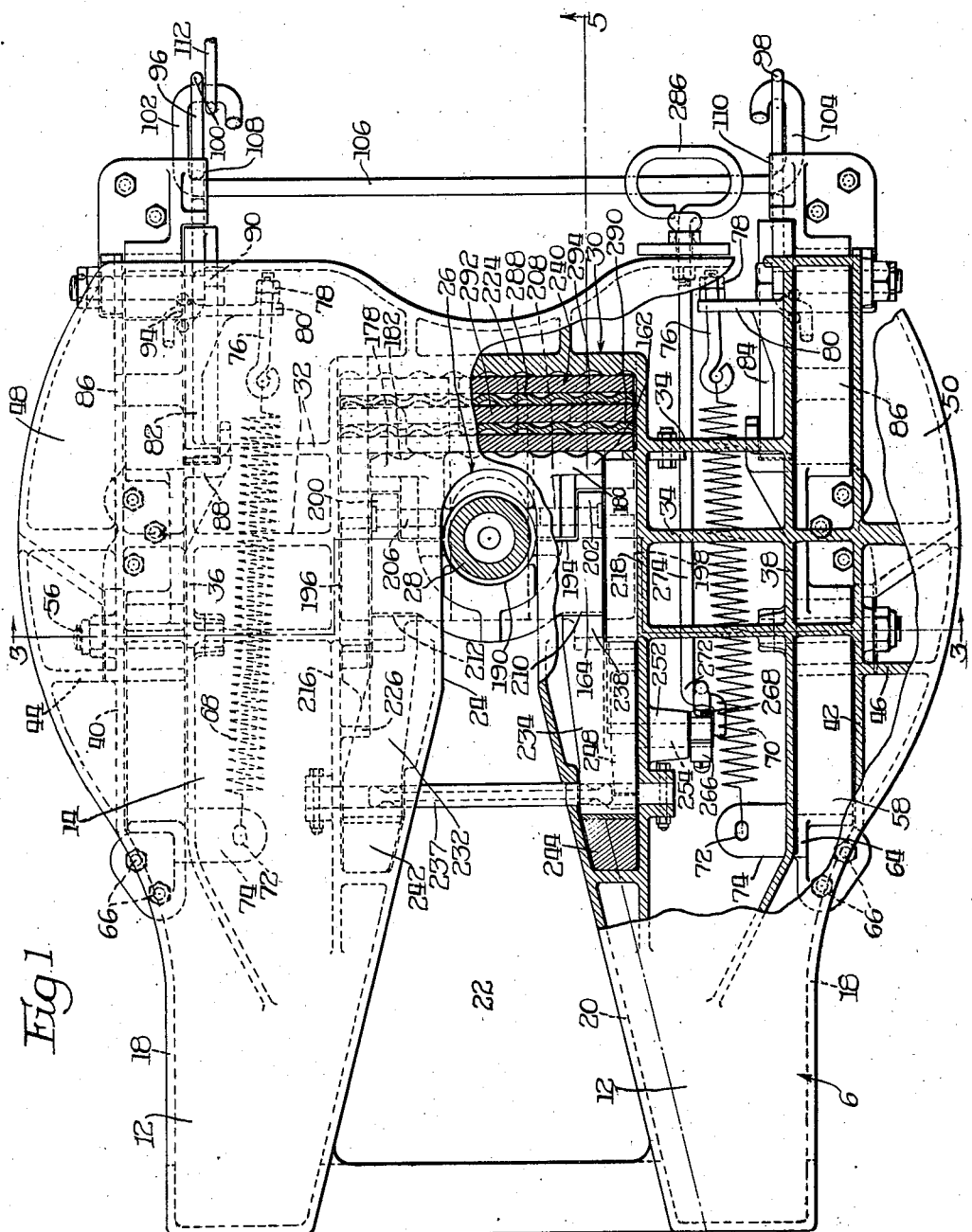

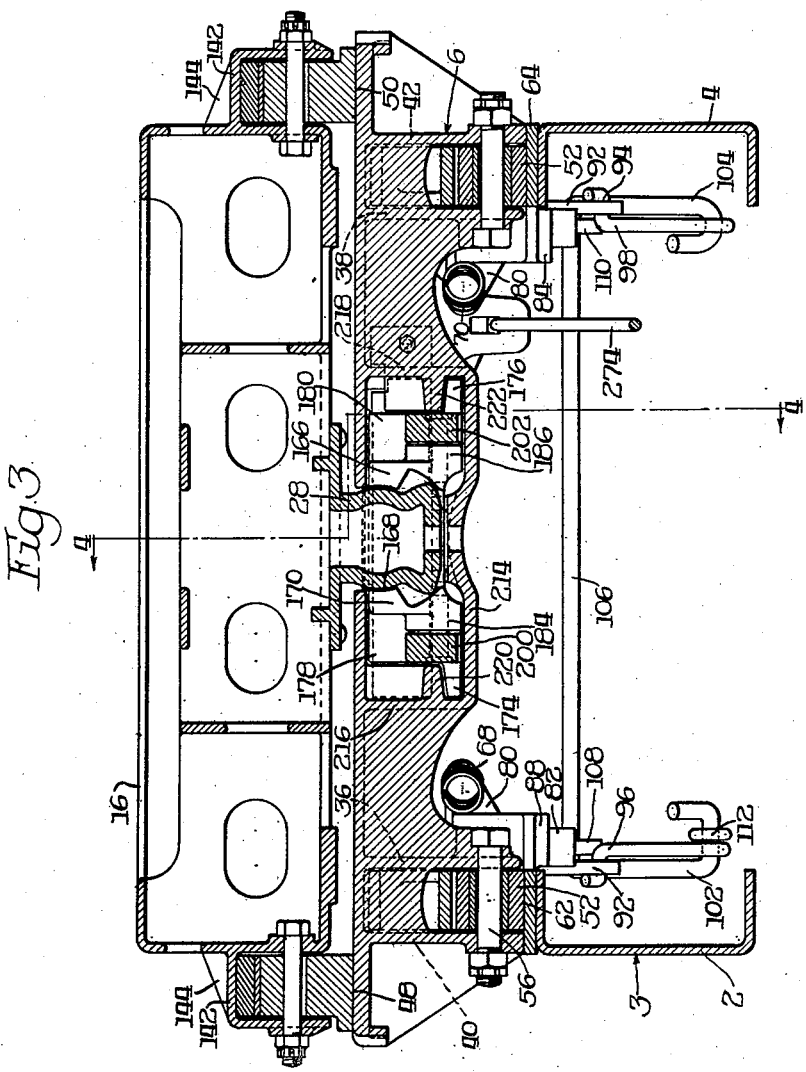

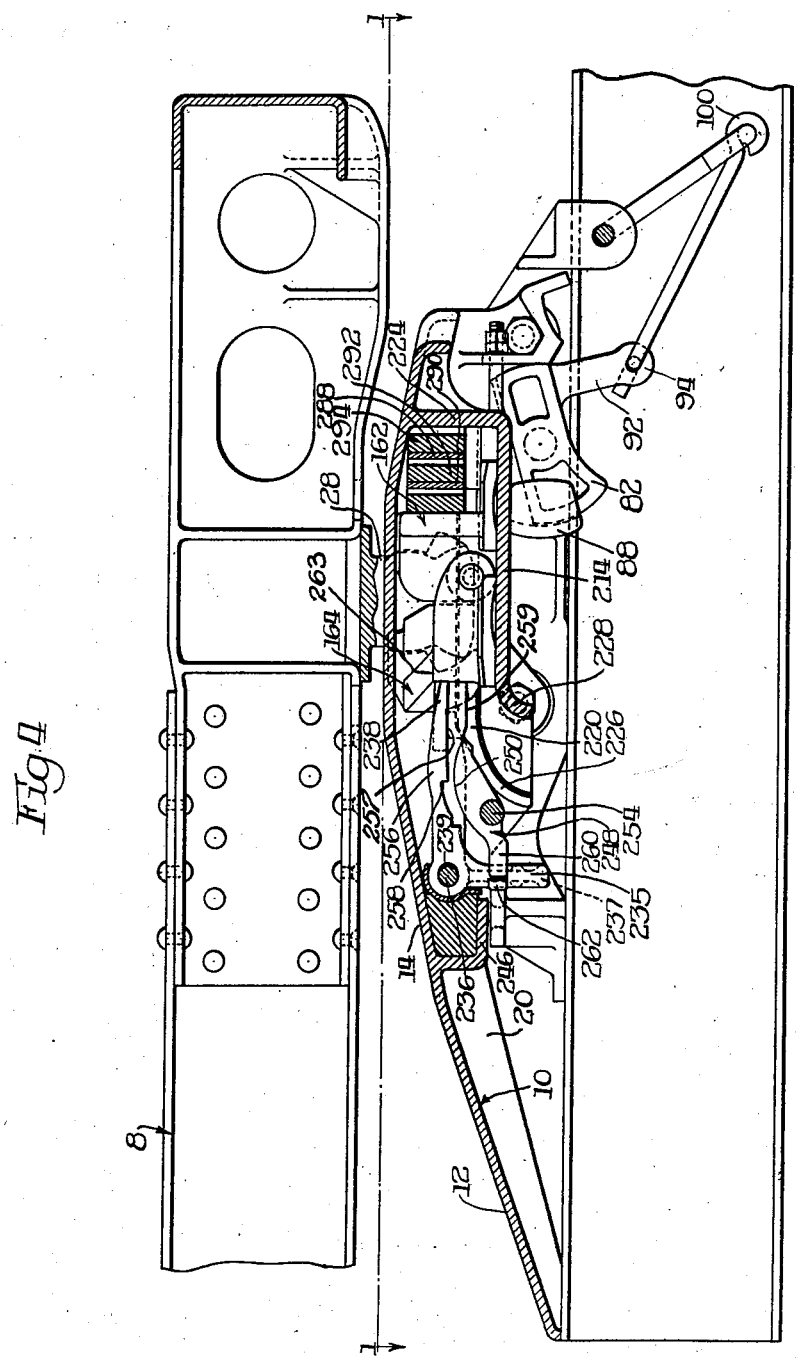

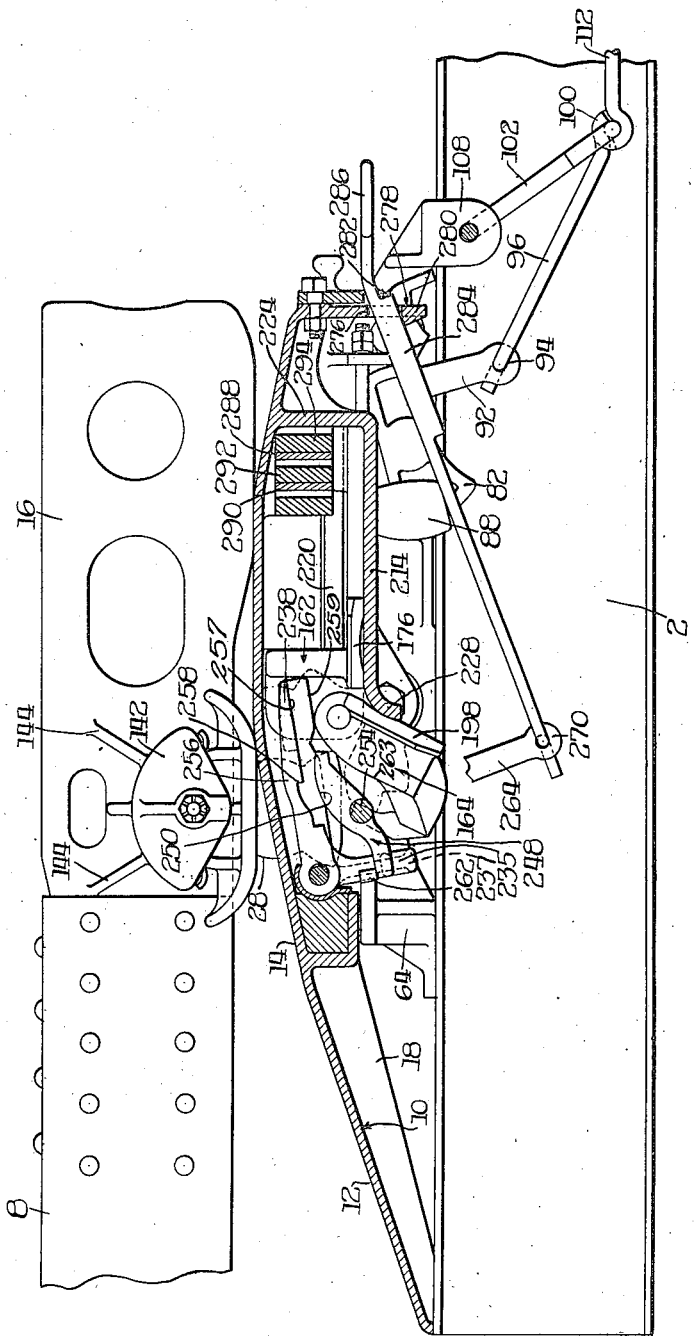

Sept. 24, 1935.  E. P. KINNE  2,015,313
TRACTOR TRAILER COUPLING DEVICE
Filed May 14, 1932   11 Sheets-Sheet 6
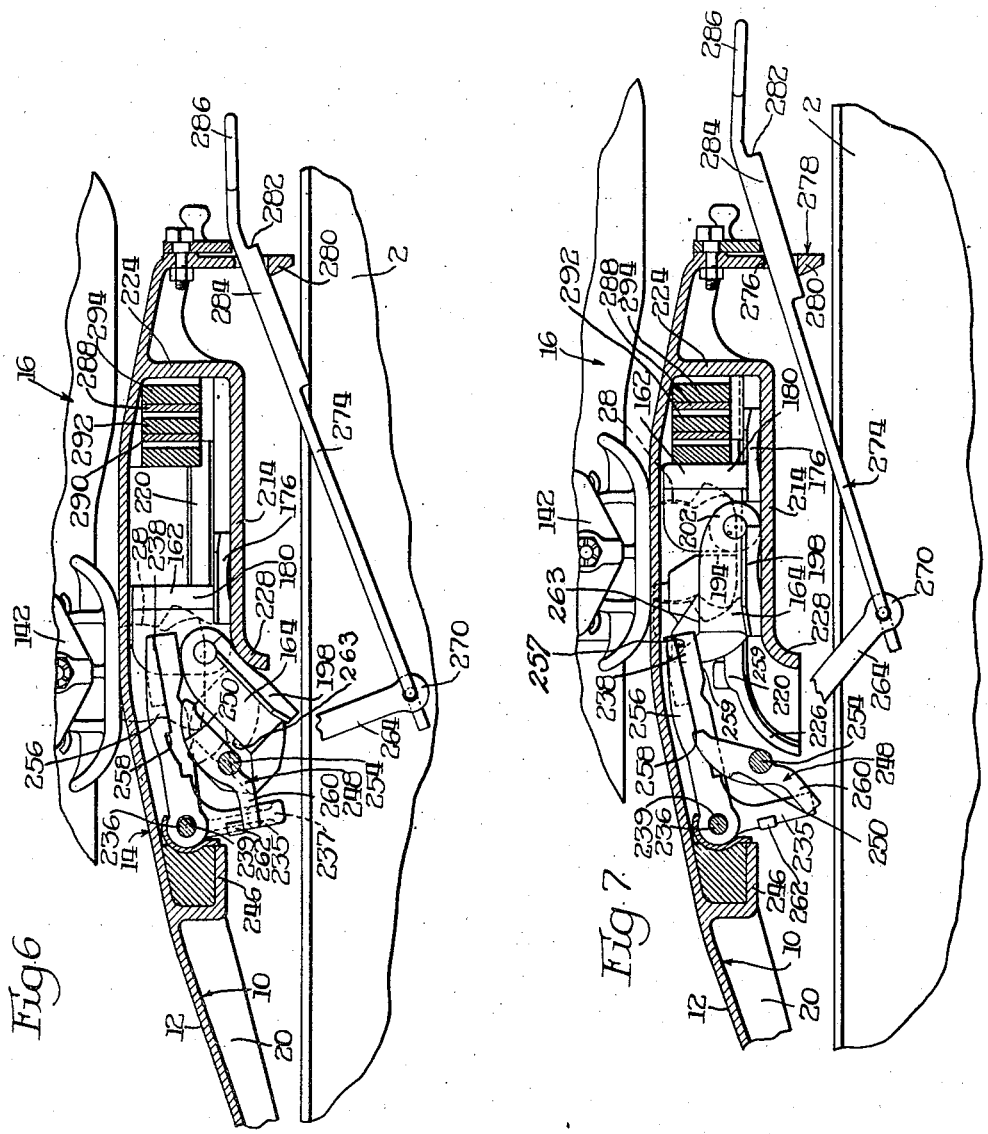
Inventor
Edmund P Kinne
By Wilkinson, Huxley, Byron & Knight
Attys Sept. 24, 1935.  E. P. KINNE  2,015,313
TRACTOR TRAILER COUPLING DEVICE
Filed May 14, 1932   11 Sheets-Sheet 7
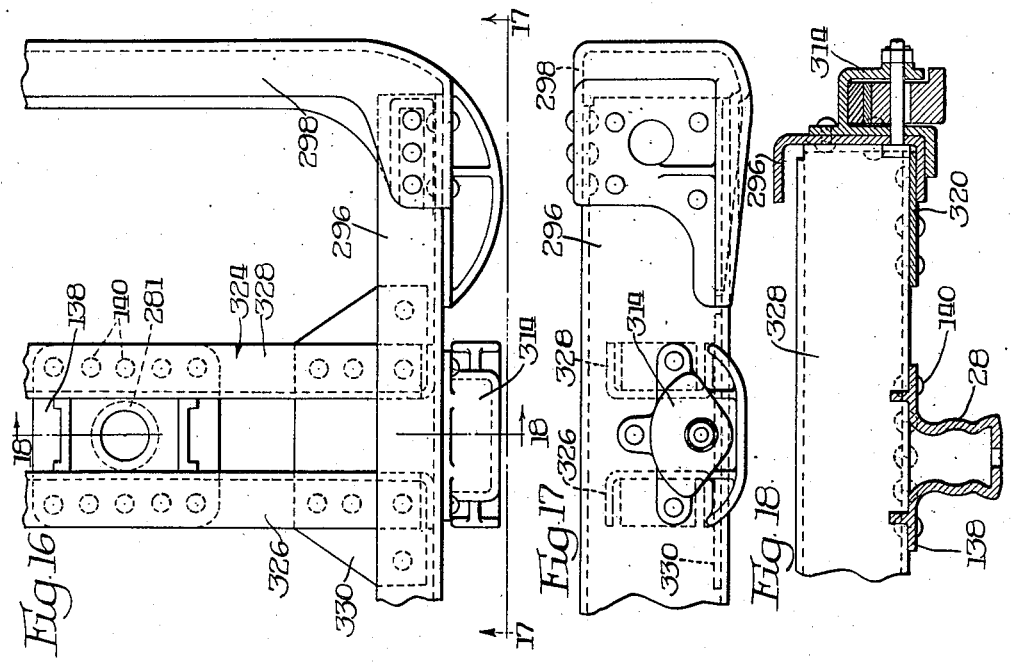
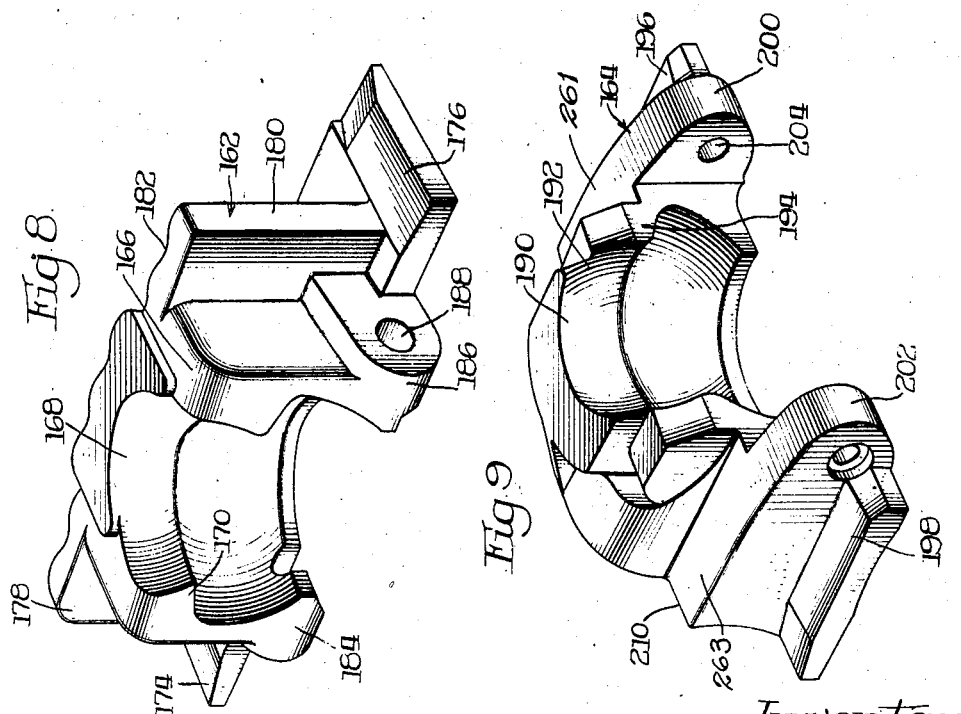
Inventor:
Edmund P. Kinne
By Wilkinson, Huxley, Byron & Knight
Attys Sept. 24, 1935.  E. P. KINNE  2,015,313
TRACTOR TRAILER COUPLING DEVICE
Filed May 14, 1932  11 Sheets-Sheet 8
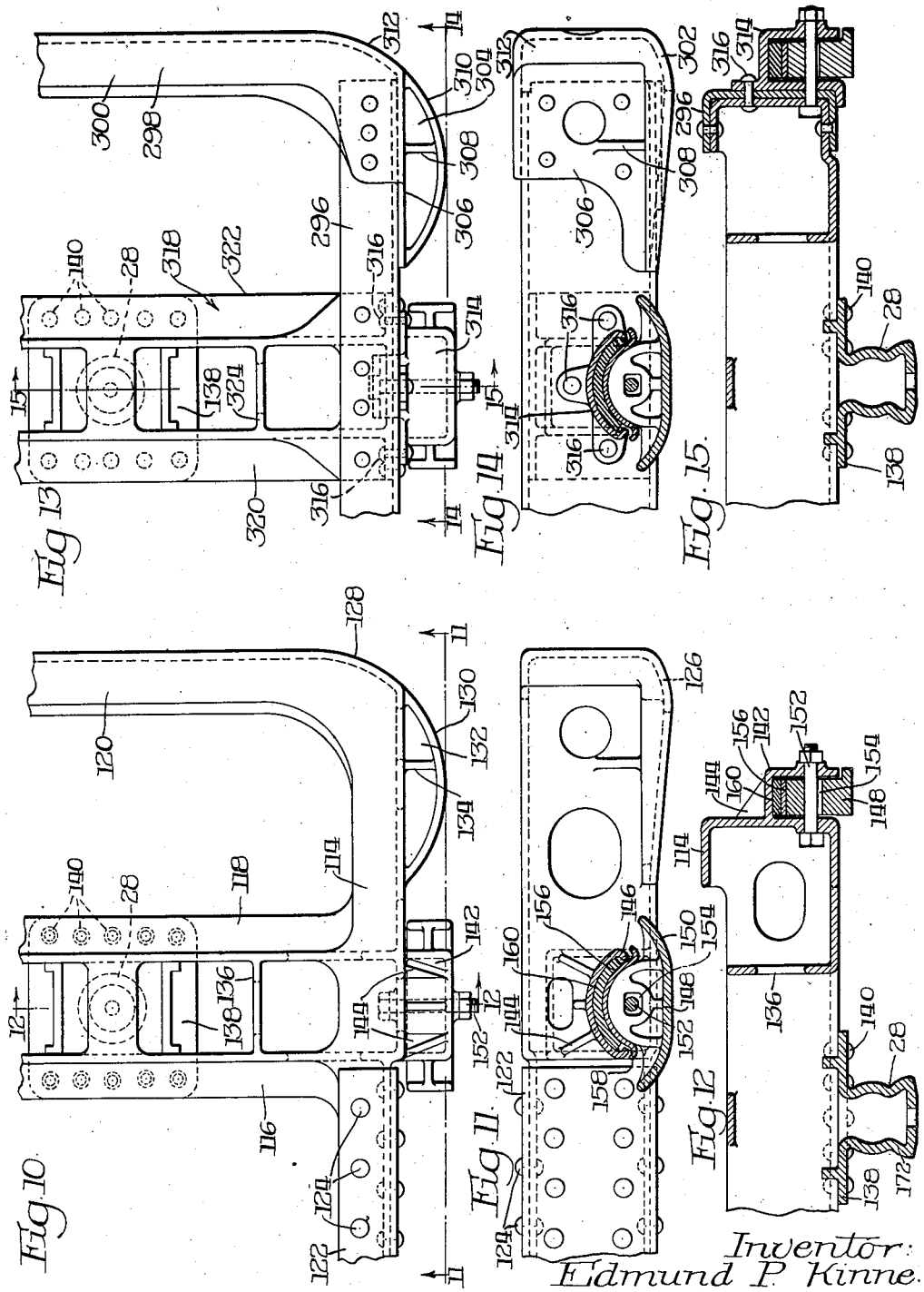
Inventor:
Edmund P. Kinne.

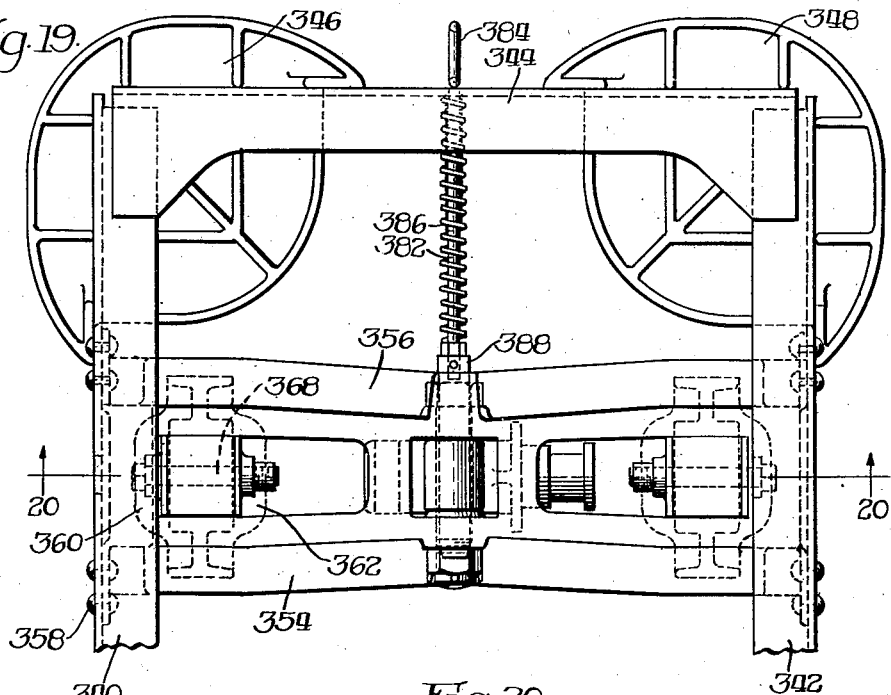
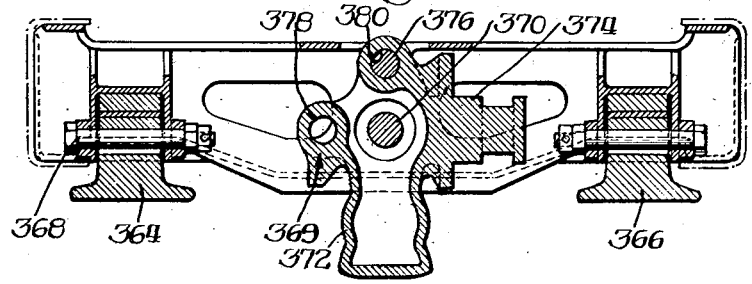
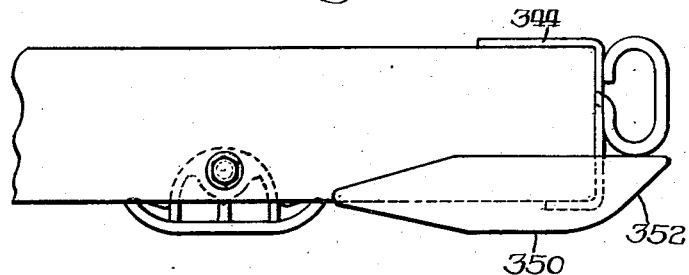

Sept. 24, 1935.  E. P. KINNE  2,015,313
TRACTOR TRAILER COUPLING DEVICE
Filed May 14, 1932   11 Sheets-Sheet 10
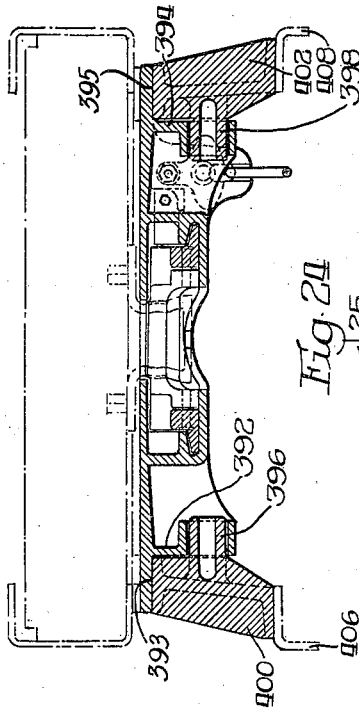
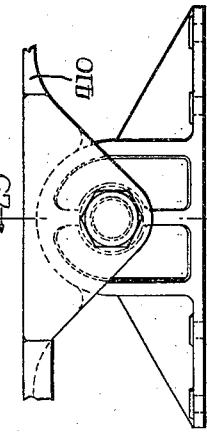
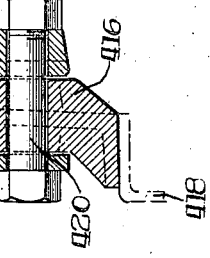
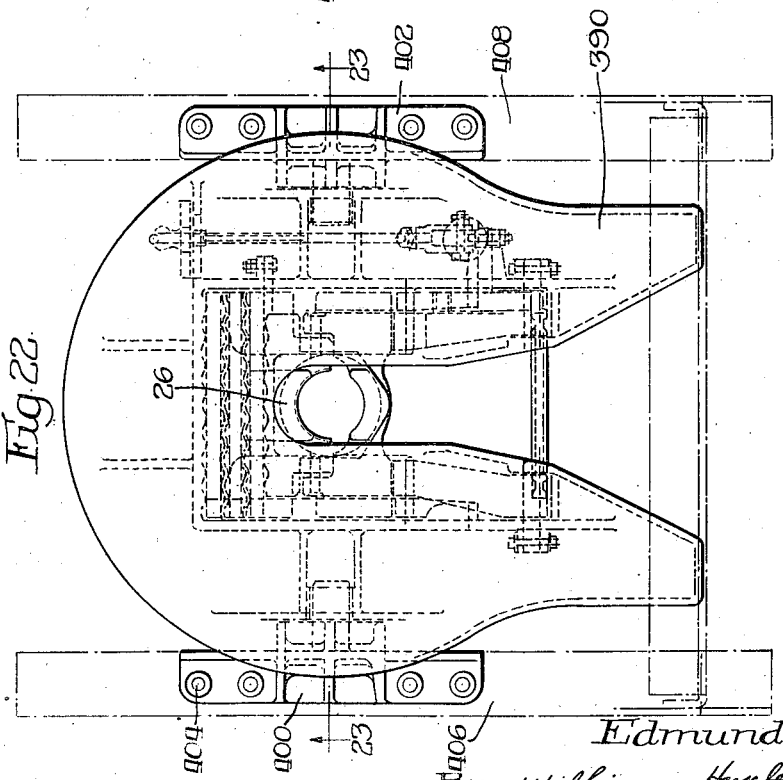
Inventor:
Edmund P. Kinne
By Wilkinson, Huxley, Byron & Knight
Attys

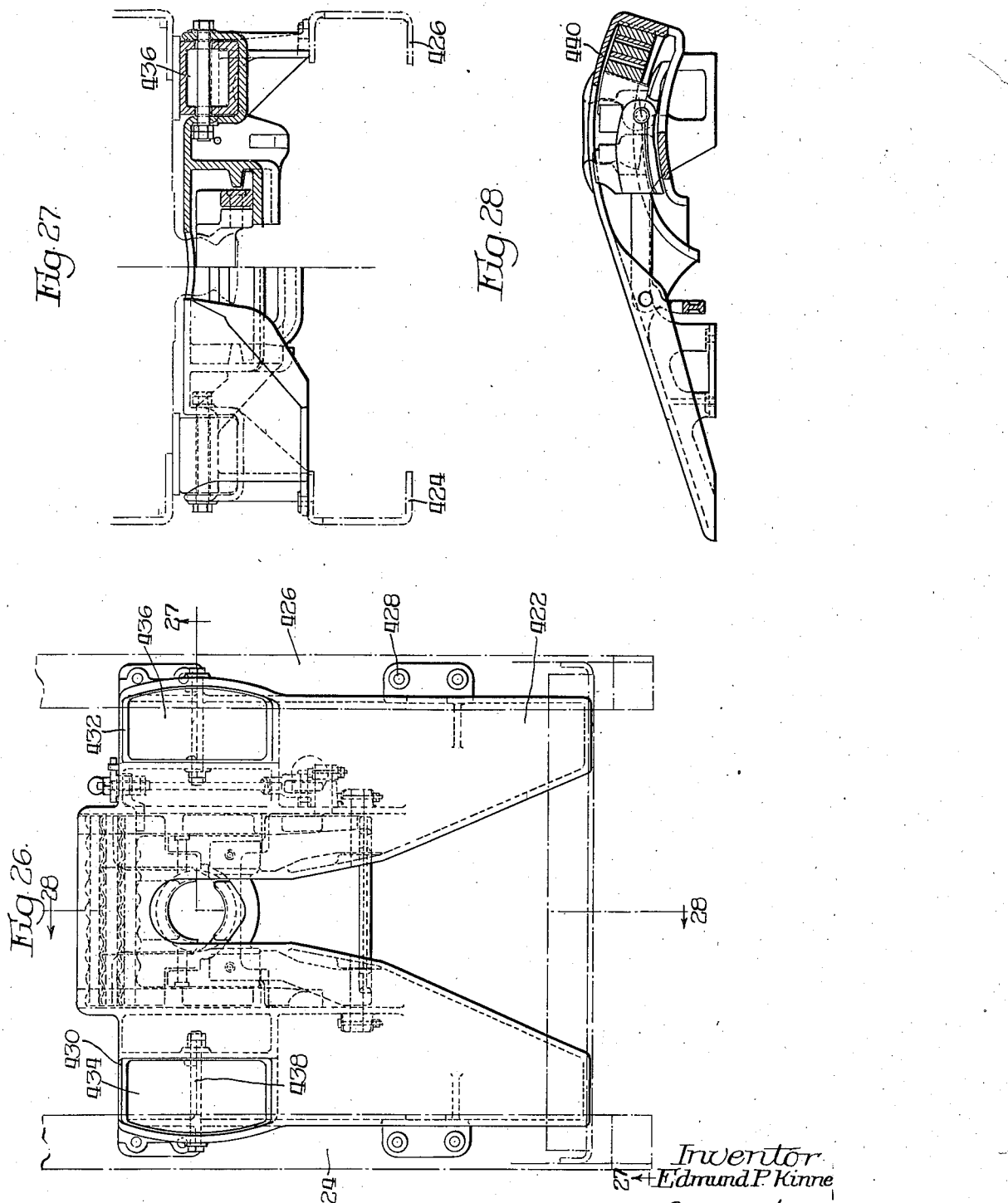

Patented Sept. 24, 1935

2,015,313

UNITED STATES PATENT OFFICE 2,015,313

TRACTOR-TRAILER COUPLING DEVICE

Edmund P. Kinne, Alliance, Ohio, assignor to American Steel Foundries, Chicago, Ill., a corporation of New Jersey Application May 14, 1932, Serial No. 611,261

55 Claims. (Cl. 280—33.1)

The present invention relates to vehicle units, and more in particular to tractor-trailer devices.

Among the objects of the present invention is to provide a novel structure such as is commonly known as a fifth wheel, of sturdy construction, whereby drawn vehicles, such as a semi-trailer may be adequately supported by and coupled to a power-driven vehicle, such as a tractor or the like.

Another object of the present invention is to provide a novel fifth wheel construction for a vehicle unit whereby substantially all of the parts thereof may be located upon one of the vehicles whereby the other vehicle, such as a semi-trailer or the like, may be of a particularly simple design.

The present invention contemplates the idea of providing novel means for support of a drawn vehicle, such as a semi-trailer, in which the load thereof may be carried by the driven vehicle, such as a tractor, at widely distributed points whereby maximum stability of the load may be obtained and swaying tendencies which would otherwise occur, overcome or eliminated. More particularly, the present invention comprehends the idea of distributing these loads at points substantially above the wheels of the driven vehicle.

Still another object of the present invention is to provide a fifth wheel of novel construction in a vehicle unit such as a tractor-trailer device, in which suitable means is provided for coupling these vehicles together, and in which the vertical stresses from the drawn vehicles are carried on the widely separated side bearing members associated with this drawn vehicle, suitable means being provided on the driven vehicle and adapted to cooperate with these bearing members whereby these stresses are effectively transmitted to the driven vehicle. In an illustrative embodiment of the present invention, the drawn vehicle is disclosed as being provided with a king pin or depending post adapted to cooperate with a coupler for effecting a coupling between the vehicles of this unit, suitable means, such as the hereinbefore referred to side bearings, being provided for transferring the vertical stresses from the drawn to the driven vehicle when the same are in a normal running position.

A further object of the present invention is to provide novel means for coupling a driven and drawn vehicle, such as a tractor-trailer combination, in which this coupling means provides for maximum flexibility between these two vehicles. By providing this novel coupling means in accordance with the present invention, the driven vehicle, such as a tractor, may be tilted both laterally and endwise from a horizontal position without affecting the level position of the drawn vehicle, such as the trailer and its load, when the tractor is turned at an angle greater than forty-five degrees with the drawn vehicle or trailer, this particular construction being especially advantageous when operating these vehicles over uneven surfaces and particularly when parking.

Still another object of the present invention is to provide novel means associated with one of the vehicles of a tractor-trailer device for effecting automatic coupling and uncoupling thereof, suitable means being further provided for automatically locking this coupling device, as well as to provide against accidental uncoupling.

The present invention further contemplates the idea of providing novel means associated with one of the vehicles of a tractor-trailer device whereby an end of the supported vehicle may be raised or elevated for positioning this supported vehicle to permit the easy and ready coupling and uncoupling of these vehicles. More particularly, the present invention includes the idea of providing novel means which is adapted to be elevated or raised in respect to one of the vehicles and with which is associated suitable means for coupling these vehicles together.

In an embodiment selected to illustrate the invention, the means adapted to be elevated is shown as comprising a ramp movably mounted on a tractor, or the like, having spring members or assemblies upon which the body thereof is mounted. When the tractor is coupled with the loaded trailer, the springs on the rear tractor wheels are considerably deflected, and after uncoupling, the tractor springs expand to their free height, at which time the top of the ramp is considerably higher than the trailer. In returning to couple, it requires that the springs be compressed, which interferes with easy coupling. In order to overcome this difficulty, the elevating ramp raises the trailer and makes it possible then to block the trailer in elevated position. The load on the trailer is then transferred from ramp or lower fifth wheel to the trailer support wheels, allowing the tractor springs to expand when the ramp is unlocked. In returning to couple, the ramp is in a floating position and is pushed down to a point where it passes under the trailer without great effort. When this is done and coupling effected, the next move is to transfer the loaded trailer from the support wheels to the ramp.

Another object within the purview of the present invention is to provide a frame for a drawn vehicle which is adapted to guide the drawn vehicle into a coupling position with the driven vehicle. More specifically, this frame is of such a design as to cooperate with certain bearing elements provided on the drawn vehicle whereby the drawn vehicle is suitably supported at a plurality of widely separated points during the coupling of these two vehicles.

The present invention also comprehends the idea of constructing this frame so as to provide suitable guiding means during coupling and uncoupling of the driven and drawn vehicles when these vehicles are at various angles one with the other.

Still a further object of the present invention is to provide a novel fifth wheel and coupling arrangement for a driven vehicle, such as a tractor, which is of simple and practical construction, and at the same time adapted for use in conjunction with many of the existing designs for a drawn vehicle, such as a trailer or the like.

Yet another object of the present invention is to provide novel means in a coupler for one of the vehicles of a tractor-trailer device, whereby the operator thereof may set the coupler in position for uncoupling so that he may at any time thereafter uncouple these vehicles without the necessity of holding such means in a position for effecting this uncoupling. Such means provides a lock-set arrangement for this coupler and thereby avoids the necessity of manipulating the coupler at the time an uncoupling of these vehicles is to be effected.

Still a further object of the present invention is to provide novel shock absorbing means adapted to be positioned for effectively absorbing the shocks to which the coupler may be subjected during coupling and uncoupling of these vehicles. Further, the present invention comprehends the idea of providing shock absorbing means adapted to be used in association with the locking means for the coupler, whereby the shocks incident to coupling and uncoupling may be absorbed in a plurality of directions.

Still another object of the present invention is to provide a simple and sturdy side bearing for use in conjunction with a drawn vehicle, such as a trailer or the like, which is of such a construction as to adequately carry and transfer vertical loads to a driven vehicle when these vehicles are in their normal running position, and which is further of such a construction as to adequately absorb the shocks to which the same is subjected without resulting in damage to the lading carried by the drawn vehicle.

The present invention still further includes the idea of providing a fifth wheel and coupling arrangement for a driven and drawn vehicle, such as a tractor-trailer device, which will meet the conditions of manufacture, assemblage and operation without the necessity of relying upon the machining of any of the parts thereof.

A still further object of the present invention is to provide novel means for coupling vehicles of a vehicle unit together, which includes a socket member adapted to receive a king pin or the like. More particularly, the invention comprehends the idea of forming this king pin and socket of novel contour, the king pin having an enlarged end so shaped as to permit substantial universal movement with a substantial amount of vertical movement, the same being limited, however, to prevent vertical separation thereof with the socket portion.

Other objects, features, capabilities and advantages are comprehended by the invention, as will later appear and are inherently possessed thereby.

Referring to the drawings:

Figure 1 is a top plan view of a fifth wheel arrangement made in accordance with the present invention, with parts broken away to disclose the construction thereof more in detail;

Figure 2 is a fragmentary view in side elevation of a tractor-trailer device incorporating a fifth wheel made in accordance with the disclosure in Figure 1 of the drawings;

Figure 3 is a view in cross section taken in the planes represented by line 3—3 of Figures 1 and 2 of the drawings;

Figure 4 is a fragmentary view in cross section taken in the planes represented by line 4—4 of Figure 3 of the drawings;

Figure 5 is a fragmentary view in cross section taken in the planes represented by line 5—5 of Figure 1 of the drawings and disclosing the relative association of parts at the beginning of a coupling of a tractor-trailer at the time the side bearings engage with the fifth wheel;

Figure 6 is a fragmentary view similar to Figure 5 of the drawings disclosing the relative association of the parts of the coupler at the beginning of coupling with substantially full bearing engagement with the fifth wheel;

Figure 7 is a fragmentary view in cross section similar to Figures 5 and 6 of the drawings, disclosing the relative association of the parts of the coupler mechanism in their lock-set position;

Figure 8 is a view in perspective of one of the members of the coupler used in connection with the present disclosure;

Figure 9 is a view in perspective of the other member of the coupler used in the present invention;

Figure 10 is a fragmentary top plan view of a frame for a drawn vehicle made in accordance with the present invention;

Figure 11 is a fragmentary view in side elevation taken in a plane represented by line 11—11 of Figure 10 of the drawings;

Figure 12 is a fragmentary view in cross section taken in a plane represented by line 12—12 of Figure 10 of the drawings;

Figure 13 is a fragmentary top plan view of another frame for a drawn vehicle made in accordance with the present invention;

Figure 14 is a fragmentary view in side elevation taken in a plane represented by line 14—14 of Figure 13 of the drawings;

Figure 15 is a fragmentary view in cross section taken in a plane represented by line 15—15 of Figure 13 of the drawings;

Figure 16 is a fragmentary top plan view of still another frame for a drawn vehicle made in accordance with the present invention;

Figure 17 is a fragmentary view in side elevation taken in a plane represented by line 17—17 of Figure 16 of the drawings;

Figure 18 is a fragmentary view in cross section taken in a plane represented by line 18—18 of Figure 16 of the drawings;

Figure 19 is a fragmentary top plan view of a still further frame for a vehicle made in accordance with the present invention;

Figure 20 is a view in cross section taken in a plane represented by line 20—20 of Figure 19 of the drawings;

Figure 21 is a fragmentary view in side elevation of the frame shown in Figure 19 of the drawings;

Figure 22 is a fragmentary top plan view of another bearing member or fifth wheel for a vehicle made in accordance with the present invention;

Figure 23 is a view in cross section taken in a plane represented by line 23—23 of Figure 22 of the drawings;

Figure 24 is a fragmentary view in side elevation of an alternative arrangement for mounting a fifth wheel upon a frame;

Figure 25 is a fragmentary view in cross section taken in a plane represented by line 25—25 of Figure 24 of the drawings;

Figure 26 is a top plan view of still another bearing member or fifth wheel made in accordance with the present invention;

Figure 27 is a fragmentary view partly in elevation and partly in cross section taken in the planes represented by line 27—27 of Figure 26 of the drawings; and Figure 28 is a view in cross section taken in a plane represented by line 28—28 of Figure 26 of the drawings.

Referring now more in detail to the drawings, a ramp or supporting member made in accordance with the present invention and serving in the capacity of what is generally termed a fifth wheel, is shown as being supported upon the spaced frame members 2 and 4 of a power-driven vehicle 3, such as a tractor or the like, these frame members 2 and 4 being substantially channel-shaped in section and being adapted to support the ramp or fifth wheel 6 upon the upper flanges thereof. This fifth wheel is in turn adapted to support the forward end of a semi-trailer, generally designated as 8, suitable means, to be hereinafter more fully disclosed, being provided for effecting a coupling of the driven vehicle with this semi-trailer.

This ramp or fifth wheel is of a shape substantially as shown in Figure 1 of the drawings, and includes a top plate portion 10 having inclined surfaces, such as 12 and 14, for guiding the front end frame 16 of the semi-trailer into the position as clearly shown in Figure 4 of the drawings. The plate portion 10 has the outer depending flanges 18 to provide a finished construction and the inner flanges 20 defining a flared slot 22 decreasing in width in a forward direction and merging with a slot 24 adjacent to and above a coupler 26, which is adapted to receive a depending post or king pin 28, as clearly shown in Figure 12 of the drawings, these flanges defining the slots 22 serving as guiding means for the depending post or king pin 28 during the coupling and uncoupling of the tractor 3 and trailer 8.

The coupler mechanism, generally referred to as 26, is operable within a housing 30 (Fig. 1) which is made integral with the top plate 10 of this fifth wheel, and the top plate is further reinforced as by means of spaced webs 32 and 34 extending laterally from both sides thereof and integrally formed with depending walls or flanges 36 and 38 which are provided in spaced relation with similar walls or flanges 40 and 42, respectively, these latter walls or flanges 40 and 42 being reinforced as by means of brackets or webs 44 and 46 extending outwardly from the walls 40 and 42, respectively, and upwardly toward the outer flanges 18 of the top plate 10 at the side extremities 48 and 50 of the fifth wheel or ramp.

The present invention comprehends the idea of providing a fifth wheel or ramp which is movably supported upon the tractor 3 and incorporates the coupling mechanism 26 therein, this particular movable arrangement being provided so that the forward end of the semi-trailer 8 may be elevated by this fifth wheel or movable ramp for effecting the results as set forth in a co-pending application, Serial No. 637,083, filed October 10, 1932. In order to movably support this fifth wheel 6 so that the same may be elevated in respect to the tractor 3, rollers, such as 52 and 54 are mounted in spaced relation, as by means of bolts 56, between the walls 36 and 40, and 38 and 42, on both sides of this movable ramp or fifth wheel, the forwardly and rearwardly disposed rollers 52 and 54, respectively, being movable within the inclined slots 58 and 60, respectively, of bracket or supporting means 62 and 64, which are mounted upon the frame members 2 and 4, respectively, and secured thereto as by means of the bolts 66 or the like.

The movable ramp or fifth wheel is normally urged in a rearward direction and into an elevated position as by means of the inclined slots 58 and 60 under the impulse of coiled springs 68 and 70, each of which has its rear end engaging in a slot 72 of brackets 74 made integral with the supporting members 62 and 64, and the other end of which engages in the eye of the rods 76 which may be connected, as by means of nuts 78 threadedly engaging the end thereof, to brackets 80 formed integral with the ramp or fifth wheel 6. Because of this arrangement for normally urging the fifth wheel into its elevated position, locking members 82 and 84 are provided, each of these locking members being formed with an integral stub shaft portion 86 suitably journaled in the supporting members 62 and 64, whereby the locking members may have movement of rotation thereabout. When the fifth wheel of the movable ramp is in the position as shown in the drawings, these locking members 82 and 84 engage with the oppositely disposed flanges such as 88 and 90 provided on the supporting members 62 and 64, and the movable ramp 6, respectively, whereby this movable ramp or fifth wheel is locked in its lowermost position in association with the tractor 3.

Each of the locks is formed with a depending arm 92 having an eye 94 engaged by the knuckled end of rods 96 and 98. These rods 96 and 98 extend downwardly and are provided with eye portions 100 adapted to engage the crank ends 102 and 104 of a rod 106 suitably mounted in the brackets 108 and 110 formed integral with the supporting members 62 and 64, respectively. Connected to the crank 102 of the rod 106 is an operating rod 112 which may extend forwardly to a point adjacent the operator of the tractor 3, whereby this operator may conveniently manipulate and control the operation of the lock members 82 and 84. As clearly disclosed in the co-pending application hereinbefore referred to, the locking members 82 and 84 serve to support the movable ramp or fifth wheel 6 in its uppermost position, whereby in coupling, the forward end of the trailer 8 may be elevated and the load thereof transferred to the movable ramp or fifth wheel from the support wheels, or upon an uncoupling, the transfer of the load is from the movable ramp to the support wheels.

In the embodiment disclosed in Figures 1 to 7 inclusive, the frame member 16 is made in accordance with the detailed disclosure in Figures 10 to 12 inclusive. In these latter figures, this frame member 16 is shown as comprising an integral construction formed with side portions 114 between which extend the transverse portions 116, 118 and 120, this frame serving as the forward part of the trailer 8 to which the under frame thereof may be connected. The side portions 114 extend rearwardly of the transverse portion 116 and may be connected to frame members 122 of the trailer 8, as by means of a plurality of rivets or the like, 124. As clearly shown in Figures 10 and 11 of the drawings, the forward transverse portion 120 is formed with a lip or nose portion 126 which has a curved lower surface and extends downwardly below the plane of the bottom surface of the other portions of this frame member and serves to initially engage with the top plate 10 of the movable ramp or fifth wheel 6. The front or outer surface of the transverse portion 120 adjacent the side portions 114 is curved as at 128 and merges with the outer curved surface 130 of guide portions 132 which extend laterally of these side portions 114. Each of these guide portions 132 is integral with the side portions 114 and is reinforced as by means of the webs 134, the lower surface of these guide portions 132 at their forward end merging with the curved lip or flange 126 of the transverse portion 120 and these surface portions extend in an inclined direction upwardly to merge with the bottom surface of the side portions 114. This particular construction of the forward frame member 16 provides means whereby the forward end of the trailer 8 is easily and readily moved upwardly over the inclined top plate portions 12 and 14 and the guide members 132 serve to properly guide the frame member 16 upwardly over the top plate 10 when a coupling between the tractor 3 and trailer 8 is being effected even though the same are disposed at an angle one with the other. The rounded nose of the trailer corners designated as guide members 132 span the central opening between the plates, which opening or slot is designated as 22. The transverse portions 116 and 118 are reinforced as by means of the webs 136 and serve to support the depending post or king pin 28 which is formed with a plate portion 138 connected to these transverse portions 116 and 118 as by means of a plurality of rivets 140, or the like.

In the present frame 16, the side portions 114 are formed with integral housings 142 which extend laterally thereof and are reinforced therewith as by means of the webs 144. These housings are formed with lips or flanges 146 defining an opening which is adapted to receive a bearing member or shoe 148 which is formed with a lower curved bearing surface 150 and is loosely and pivotally secured in the housing 142 as by means of the bolt 152, this loose connection being provided as by means of the enlarged opening 154 which receives the bolt 152, thereby providing an arrangement whereby the shoe 148 may have linear movement with respect to the bolt 152. Interposed between each of the bearing members 148 and the housing 142 is an arcuate bearing plate 156 conforming to the upper curved surface of the bearing shoe 148, this plate 156 being formed with ips 158 engageable with the lips or flanges 146 provided on the housing 142, whereby the movement of the bearing shoe 148 is limited in its rotary movement. Between the plate 156 and the housing 142 is a rubber pad or other resilient material 160 for absorbing the shocks transferred through the bearing member 148 to the frame member 16.

As clearly shown in Figure 5 of the drawings, the flanged portion or nose 126 of the frame member 16 initially comes in contact with the inclined surface portions 12 and 14 of the top plate 10 when a coupling between the tractor 3 and trailer 8 is being effected. This frame member 16 passes over these inclined surfaces 12 and 14 into a position as shown in Figure 5 of the drawings before the bearing shoes 148 engage with the top plate 10 of the side extremities 48 and 50, after which, further relative movement between the tractor 3 and trailer 8 causes a transfer of the load from the frame 16 to these side bearings 148. It will be noted that the side bearings 148 are in substantial spaced relation, whereby maximum stability of the load carried by the trailer 8 is attained and the swaying tendencies of this trailer may be effectively overcome. It is also to be noted that these side bearings or shoes 148 which are supported by the outer extremities 48 and 50 of the movable ramp are positioned laterally and outwardly of the frame members 2 and 4, so as to be substantially over the wheels of the tractor 3, thus further adding to the stability of the trailer which is shown in the present disclosure.

During the movement of the frame member 16 over the inclined surfaces 12 and 14 of the ramp or fifth wheel, the depending post or king pin 28 is received within the flared slot 22 and is guided by means of the flanges 20 thereof toward the opening of the slot 24 and into a position for engaging the coupler for coupling the tractor 3 and trailer 8 together.

The coupler 26 of the present embodiment comprises a forward member 162 and a rear member 164, the construction of which is more clearly disclosed in Figures 8 and 9 of the drawings. The forward coupler member 162 is formed with a central body portion 166 which is provided with a recess 168 having a surface conforming substantially to the contour of the king pin 28, this recess 168 being formed with an overhanging ledge portion 170 adapted to overhang the enlarged part 172 (Fig. 12) of the king pin 28 and for holding the same against accidental removal. In this connection, it will be seen that the king pin may have substantial universal movement within the coupler with a substantial amount of vertical movement or play, the same, however, being limited by engagement of the enlarged part 172 with the shoulders of the coupler members to prevent vertical separation. The coupler member 162 is further formed with laterally extending flanges 174 and 176 adapted to provide supporting means for this coupler member, as will be hereinafter more fully disclosed. The body portion 166 is further formed with laterally extending wall portions 178 and 180, the forward surface of which, together with the forward surface of the body portion 166, is corrugated, as shown at 182, for a purpose to be later more fully disclosed. These laterally extending wall portions 178 and 180 also serve to engage with locking members for limiting the movement of the coupler in a manner to be more fully disclosed. The body portion 166 of this coupler member is further formed with pintles 184 and 186 provided with openings, such as 188, for receiving pins for pivotally securing the same to the rear coupler member 164.

The coupler member 164 is of a construction somewhat similar to the coupler member 162 and includes a body portion 190 formed with a recess 192 provided with an overhanging ledge 194, the recess 192 of this coupler member being adapted to form a cavity with the recess 168, when the coupler members 162 and 164 are in engaging relation, for receiving the king pin 28 and for holding the same in associated relation with the vehicle upon which the coupler 26 is mounted. The coupler member 164 is similarly provided with the laterally extending flanges 196 and 198 corresponding to the flanges 174 and 176 of the coupler member 162, which also serve to support this coupler member 164. This coupler member 164 is further formed with pintles 200 and 202 having apertures 204 adapted to be placed in alignment with the apertures 188 of the coupler member 162 so as to receive pivot pins 206 and 208, as clearly shown in Figure 1 of the drawings, whereby these coupler members 162 and 164 are pivotally secured together and have relative movement one with the other. The rear end of the coupler member 164 is formed with spaced plane surfaces 210 and 212 for engagement with locking members for a purpose to be hereinafter more fully set out. It is of course understood that the coupler members 162 and 164 may be provided with recesses forming a cavity to receive a king pin of any desired design without departing from the spirit of the present invention.

As clearly shown in Figures 3 and 4 of the drawings, the coupler members 162 and 164 are supported for movement upon the bottom plate 214 of the housing 30, the side walls 216 and 218 of the housing 30 being formed with inwardly disposed flanges 220 and 222, respectively, which are adapted to overhang the laterally extending flanges of the coupler members 162 and 164 and for guiding the same during their movement within the housing 30. The overhanging flanges 220 and 222 terminate or merge at their forward ends with the forward end wall 224 of the housing 30, while their rear ends are curved in a downward direction as shown at 226 to provide an open groove or slot with the bottom plate member 214 which curves downwardly in a similar manner in spaced relation with the portion 226, as at 228. It will be clearly apparent that upon rearward movement of the coupler 26, the rear member 164 thereof will have pivotal movement in respect to the forward coupler member 162 when the same drops over the rearward curved end 228 (Fig. 5) of the plate 214.

As clearly shown in Figure 4 of the drawings, the semi-trailer 8 is supported upon the movable ramp 6 and is in its normal running position with the tractor 3, the king pin 28 thereof being received between the coupler members 162 and 164. At this time, the coupler members 162 and 164 are normally locked in position by means of locking members 232 and 234 which are integrally formed with depending portions, such as 235, (Fig. 6) and connected as by means of an integral transverse portion 237, this integral locking unit being pivotally mounted upon a transverse shaft 236, which is suitably secured in the movable ramp or fifth wheel 6. The forward end 238 of the locking members 234 and 232 is adapted to engage with the plane locking surfaces 210 and 212, respectively, of the rear coupler member 164, whereby the forward coupler member 162 is held in contacting engagement with a cushioning mechanism 240, the detailed construction of which will be later more fully described. Each of the locking members 232 and 234 of the locking unit is provided with the enlarged opening 239 surrounding the transverse shaft 236, whereby the same may have rearward movement in respect to this transverse shaft, these locking members 232 and 234 being cushioned as by means of rubber pads 242 and 244, which are enclosed between the flanges 20 and the walls 216 and 218 of the housing 30, and are supported upon ledges, such as 246, extending between these walls.

The integral locking unit comprising the locking members 232 and 234 is moved about the transverse shaft 236 as by means of a dog 248 which is mounted upon a stub shaft or rod 254 mounted for rotation within a bearing 252 provided on the wall 218 of the coupler housing 30, this dog 248 being formed with an upper curved surface 250 engageable with a laterally extending lug or ledge 256 formed integral with the lock member 234. This lug or ledge is provided with a notch 258 engageable by the forward end of the dog 248, whereby the integral locking unit comprising the locking members 232 and 234 may be locked in raised position when the ends of these locking members are moved out of engagement with the locking surfaces 210 and 212 of the rear coupler member 164. The dog 248 is formed with a tail portion 260 (Fig. 4) normally in line with a lug 262 (Fig. 4) extending laterally from the depending portion 235 (Fig. 6) of the lock 234 (Fig. 1), whereby the integral lock unit comprising the lock members 232 and 234 is held against accidental unlocking when the coupler members 162 and 164 are in a coupling position. The dog 248 (Fig. 4) is operated and controlled as by means of a lever 264 (Fig. 7) having a split hub 266 (Fig. 1) adapted to receive the outer end of the shaft or rod 254 (Fig. 1) and be secured thereto as by means of a bolt 268 (Fig. 1), this lever 264 being formed with an eye portion 270 (Fig. 7) at its lower end, which is engaged by the knuckled end 272 (Fig. 1) of an operating rod 274 (Fig. 1). This rod extends in a forward direction and is operable within an opening 276 (Fig. 7) provided in the depending flange 278 (Fig. 7) of the ramp or fifth wheel 6, the lower portion of the flanges 278 being of increased thickness to provide a latch portion 280 (Fig. 7) which is engageable with the forward shoulder 282 (Fig. 7) of a flattened portion 284 (Fig. 7) provided at the forward part of the operating rod 274, the engagement between the shoulder 282 and the latch 280 providing means whereby the dog 248 is maintained in position as shown in Figure 4 of the drawings and in the path of movement of the lug 262 so as to prevent accidental unlocking of the locking members 232 and 234. The operating rod 274 is formed with a handle 286 (Fig. 7) at its forward portion, whereby the same may be readily manipulated for operating the dog 248.

When it is desired to effect an uncoupling of the tractor 3 and trailer 8, the operating rod 274 is moved to rotate the dog 248 from its normal position, as shown in Figure 4 of the drawings, to that as shown in Figure 7 of the drawings, the forward end of the dog 248 engaging with the under surface 257 of the lug 256 of the lock 234 to raise the lock unit whereby the forward ends of the locks 232 and 234 are moved out of engagement with the surfaces 212 and 210 of the coupler member 164. The dog 248 is maintained in the position as shown in Figure 7 of the drawings by engagement with the shoulder 258 of the lug 256. Because of this lock-set position, the tractor 3 and trailer 8 may be uncoupled at any time after operation of the dog 248, as by means of relative movement therebetween.

After this dog 248 has been rotated into the position as shown in Figure 7 of the drawings, a forward movement of the tractor 3 will cause the king pin 28 to engage with the coupler member 164 and to cause the coupler as a unit to move rearwardly.

During this movement, the locks 232 and 234 are engaged as at 259 by the ledges 261 and 263, respectively, to raise these locks upwardly, the upward movement of the lock 234 effecting a release of latch or dog 248. Upon release, the latch 248, under the weight of lever 264, is rotated until the tail 260 engages lug 262. The lock and lock operating latch 248 are therefore in a position whereby an automatic coupling and locking thereof may be effected, the locks 232 and 234 engaging with the element 164 to lock the coupler upon return thereof to its coupling position. At this time, the lug 262 permits return of latch 248 to the position shown in Figure 4 of the drawings and the lock is prevented from accidentally moving into an unlocked position. Upon further movement of the coupler rearwardly, the flanges 196 (Fig. 9) and 198 of the coupler member 164 (Fig. 9) move over the curved surface 228 (Fig. 5) of the lower plate 214, this coupler member 164 drops downwardly (Fig. 5) and out of the path of movement of the king pin 28, whereby the tractor 3 may be moved from beneath the trailer 8. The rearward movement of the coupler as a unit is limited because of the engagement of the forward end 238 of the locking members 232 and 234 with the wall portions 178 and 180, respectively, of the coupler member 162.

Assuming now that the coupler is in an uncoupled position, as shown in Figure 5 of the drawings, and it is desired to effect a coupling between the tractor 3 and trailer 8. This may be effected by moving the tractor 3 into a position whereby the ramp or fifth wheel 6 engages with the frame member 16, during which movement the king pin is guided by means of the flanges 20 into the slot 24. This king pin 28 will engage with the forward coupler member 162 to cause a forward movement thereof, this forward movement likewise causing pivotal movement of the coupler member 164 in relation thereto, as this latter coupler member moves upwardly over the curved surface portion 228. Upon further relative movement between the tractor 3 and trailer 8, the coupler member 164 will move forwardly of the forward end of the locking members 232 and 234, whereby these locking members automatically move about the transverse shaft 236 into engaging relation with the locking surfaces 212 and 210, respectively, of the coupler member 164, thereby effecting an automatic locking of the coupler members in their coupling position.

The coupler is cushioned in a forward direction as by means of the cushioning mechanism 240 (shown most clearly in Figure 1) which comprises a plurality of plates 288 and 290, which are corrugated to provide an undulating surface and between which is provided a resilient pad 292 of some such material as rubber or the like. A similar pad of material is also interposed between the coupler member 162 and the plate 290, while a third pad 294 of this resilient material is also placed between the plate 288 (Fig. 1) and the forward wall 224 of the housing 30, which is formed with a corrugated surface corresponding to the corrugated surface of the coupler member 162. Upon a forward movement of the coupler member 162, the pads of resilient material are compressed so as to tend to conform to the shape of the cooperating adjacent corrugated surfaces, the compression of these resilient pads serving to absorb the shocks and forces to which the coupler may be subjected.

In Figures 13 to 15 inclusive, the under frame members 296 of the trailer 8 may extend farther forward than the corresponding frame members 122, as shown in Figures 10 to 12 inclusive of the drawings, and may have secured at their forward ends a frame member 298 which comprises an elongated transverse portion 300 having a curved depending lip 302 corresponding to the lip 126 of the embodiment shown in Figures 10 to 12 inclusive, of the drawings. Guide members 304 may be provided integral with this elongated portion 300 and correspond to the guide portions 132 of the hereinbefore referred to integral frame member, these guide portions 304 being reinforced with an end plate 306 as by means of a web 308 these guide portions 304 being formed with an outer curved surface 310 merging with a curved surface 312 formed on the elongated portion 300. This particular construction provides a suitable guide means for the trailer upon movement of the same over the inclined ramp or fifth wheel and for effecting the results set out in connection with the discussion of Figures 10 to 12 inclusive. In this embodiment, suitable bearing housings 314 may be secured to the side frame members 296, as by means of the rivets 316 or the like, this particular arrangement corresponding essentially with the construction as hereinbefore disclosed in Figures 10 to 12 inclusive. Extending between the side frame members 296 is a bolster 318 comprising the spaced members 320 and 322 integrally connected as by means of the webs 324, this bolster 318 being secured to the frame members 296 in any desired manner. Depending from the members 320 and 322 is a king pin 28 having a plate portion 138 secured to the bolster 318, as by means of a plurality of rivets or the like 140.

In Figures 16 to 18 inclusive is disclosed a still further alternative construction for the forward portion of a trailer. This arrangement corresponds essentially with the disclosure in Figures 13 to 15 inclusive. The side frame members 296 of the trailer are connected at their forward ends, as by means of a frame member 298 corresponding to that disclosed in Figure 13 of the drawings. The frame members 296 may have bearing housings 314 secured thereto in the manner as hereinbefore described in connection with Figures 13 to 15 inclusive. The frame construction as disclosed in Figures 16 to 18 inclusive varies from that as disclosed in Figures 13 to 15 inclusive, in that the transverse bolster 324 is formed from separate transverse frame portions 326 and 328 which are secured to the frame members 296 as by means of the gusset plates 330. As before, a king pin 28 having a plate portion 138 secured to the members 326 and 328 as by means of the rivets 140 is provided, whereby the trailer may be coupled with the tractor.

In Figures 19 to 21 inclusive is disclosed an alternative frame construction for a vehicle made in accordance with the present invention, and the same comprises side frame members 340 and 342 which may be channel-shaped, as more clearly disclosed in Figure 20 of the drawings.

Transversely disposed and extending between the side frame members 340 and 342 adjacent their ends is a frame member 344 of channel shape, as more clearly shown in Figure 21 of the drawings, this member being secured in any desired manner to these side frames. When this frame is to form a part of a vehicle, such as a trailer or the like, which is to be coupled with a tractor or other similar vehicle, pickup members 346 and 348 may be provided adjacent the ends of the side frame members 340 and 342, and at the corners formed with the transversely disposed frame member 344, whereby suitable supporting means is provided for movement of the end of this frame over a bearing member, as for example, a ramp or the like, as previously described and used in connection with a tractor or other power-driven vehicle. These pickup members 346 and 348 are shown as being formed as separate castings provided with a central bearing portion 350 and an upwardly curved end portion 352, whereby the same may have uninterrupted movement over the surface of a ramp or other bearing member of a trailer or the like. Although these members are formed as separate castings, it is of course understood that the same may be formed integral with the side frame members and the transversely disposed frame member 344.

In order to movably support the end of this frame construction upon a bearing member or fifth wheel of a tractor or the like, a transverse bolster of integral construction and having the spaced members 354 and 356 is interposed between the side frame members 340 and 342 in spaced relation to the transverse frame member 344, and connected to the side frame members in any desired manner as by means of a plurality of rivets or the like 358. The spaced members 354 and 356 are connected adjacent each end thereof as by means of the spaced bearing supporting members 360 and 362 adapted to receive bearings 364 and 366 therebetween, these bearings being supported between the members 360 and 362 as by means of bolts 368 or the like, whereby the bearings are movably supported and have bearing engagement with the bearing member or fifth wheel of the tractor at all times and irrespective of the vertical relative movement between the same and frame disclosed.

In order to couple the trailer to the tractor or the like, a king pin member 369 is supported, as by means of a bolt 370, between the spaced members 354 and 356 of this bolster, this king pin member being formed with a king pin portion 372 conforming to the king pin 28 of the hereinbefore described embodiment, as likewise a king pin portion 374 which is adapted to be used with coupling members of a construction other than that shown in the present embodiment, this additional king pin portion being provided to adapt the present embodiment for use in conjunction with trailers or the like having coupling elements different than those as shown in the present application. This king pin member 369 may be retained or locked in either of its two positions, whereby either of the king pin portions 372 or 374 extend downwardly below the bolster member, as by means of a plunger rod 376 adapted to be received in either one of the openings 378 or 380 formed in this king pin member. This locking plunger 376 is maintained within either one of these openings 378 or 380, and removed therefrom when desired, as by means of a rod 382 having its outer end mounted in the transverse frame member 344 and having a handle 384, whereby the same may be moved. This rod 382 is held against outward movement by a coil spring 386 interposed between a shoulder 388 adjacent the plunger member 376 and the vertical web of the frame member 344.

In Figures 22 and 23 is disclosed a further alternative construction for a bearing member or fifth wheel made in accordance with this present invention. In this embodiment, the fifth wheel 390 is similar to that disclosed in Figure 1 of the drawings and is of a construction to provide for a coupler mechanism 26 which has been heretofore disclosed and described. In this embodiment, the fifth wheel 390 is provided with oppositely disposed depending walls 392 and 394 suitably apertured to receive the stub shaft portions 396 and 398 of bearing or supporting members 400 and 402 rigidly secured as by means of rivets or bolts or the like 404 to the frame members 406 and 408, respectively, of a tractor or other power-driven vehicle. In the previously described embodiment shown in Figure 1 of the drawings, the fifth wheel or movable ramp is so constructed as to be moved into an elevated position relative to the frame members of the tractor or other similar power-driven vehicle. In this embodiment, however, the fifth wheel or movable ramp 390 is pivotally mounted upon the stub shaft portions 396 and 398, whereby the same may have movement of rotation about these elements, thereby providing a construction in which the ramp is maintained in its bearing relation with engaging elements or members of a supported trailer or other similar vehicle at all times, and irrespective of the relative angular movement between the same and the tractor or other power-driven vehicle. As clearly shown in the drawings, clearance is provided between shaft portions 396 and 398 and the depending walls 392 and 394, respectively, the fifth wheel being supported over the surfaces as at 393 and 395. By this construction, the stub shafts merely serve to hold the fifth wheel in position and no machining of these parts is required.

In Figures 24 and 25 is disclosed an alternative construction for a fifth wheel 410 pivotally mounted in a similar manner to the fifth wheel 390 of the previously described embodiment. In these figures, the fifth wheel 410 is disclosed as being formed with spaced depending walls 412 and 414 adjacent the sides thereof which are adapted to receive the bearing or supporting members 416 therebetween, these members being in turn secured to the frames 418 of the tractor or other power-driven device. The supporting members 416 are formed with openings adapted to be placed in alignment with suitable openings formed in the walls 412 and 414 and the ramp or fifth wheel 410 is pivotally supported on the members 416 as by means of bolts 420 inserted through these aligned openings. It will be noted that clearance is provided between bolts 420, the supporting members 416 and depending walls 412 and 414. The fifth wheel and supporting members are provided with the cooperating arcuate surfaces 413 and 415, respectively, to provide for pivotal movement of the fifth wheel relative to the vehicle, the bolts 420 being normally free of load because of the clearance provided and merely serving to prevent unauthorized displacement of the fifth wheel relative to the vehicle.

In Figures 26 to 28 inclusive is disclosed still another ramp or fifth wheel made in accordance with the present invention, this fifth wheel 422 being of a construction similar to the fifth wheel 6 of the embodiment shown in Figure 1 of the drawings, and has a coupler mechanism 26 corresponding to that shown in the first described embodiment for coupling a drawn vehicle to the vehicle with which this ramp or fifth wheel is associated. In the present embodiment, however, the ramp or fifth wheel 422 is rigidly secured to the frame members 424 and 426 of the tractor or other power-driven vehicle as by means of a plurality of bolts, rivets or the like 428 instead of being movably associated therewith, as disclosed in Figure 1 of the drawings. In order to provide for a constant bearing between the drawn vehicle and this ramp or fifth wheel 422, and irrespective of the relative vertical angling between these two vehicles, this ramp 422 is formed with spaced pockets 430 and 432 having the spaced bearing members 434 and 436 therein, each of these bearing members being pivotally secured to the fifth wheel 422 as by means of a bolt or the like 438 mounted in oppositely disposed walls forming these pockets or recesses. These bearing members are therefore adapted to maintain their intimate bearing relation over an extended surface with the frame or frame elements of the drawn vehicle and irrespective of the relative vertical angling of these vehicles. As clearly shown in Figure 28 of the drawings, this ramp or fifth wheel 422 is of somewhat different construction than the ramps heretofore disclosed, in that the top plate portion 440 is curved, as disclosed, and the bearing members 434 and 436 have their upper surface elevated above the highest surface portion of this curved plate 440, whereby this relative vertical angling of the vehicles may be effected without causing a separation of the bearing relation between these bearing members and their associated frame elements on the drawn vehicle.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. A device for coupling vehicles, comprising a member associated with one vehicle, a coupler having front and rear elements pivoted together on a horizontal axis and movable as a unit relative to the other of said vehicles during coupling and uncoupling operations and adapted to receive said member, and means for locking said coupler in coupled or uncoupled positions.

2. A device for coupling vehicles, comprising a member associated with one vehicle, a coupler adapted to receive said member and movable relative to the other of said vehicles from a coupled to an uncoupled position, and means for locking said coupler in said coupled position, said means acting to limit movement of said coupler during uncoupling thereof.

3. A device for coupling vehicles, comprising a member associated with one of said vehicles, a coupler associated with the other of said vehicles for receiving said member, said coupler being movable during coupling and uncoupling of said vehicles, and means automatically controlled by said coupling for locking said coupler in coupled position during coupling of said vehicles, said means acting to limit movement of said coupler during uncoupling thereof.

4. A device for coupling vehicles comprising a member associated with one of said vehicles, and a coupler comprising relatively movable members associated with the other of said vehicles for receiving said first named member, one of said last named members normally moving downwardly out of the path of said first named member during uncoupling of said vehicles, said downwardly movable member being movable into coupled position by the other of said movable members during coupling of said vehicles.

5. In a vehicle, the combination of a frame, a coupler longitudinally movable relative to said frame into coupled and uncoupled positions, and abutment means for locking said coupler in its coupled position, said means serving to limit movement of said coupler in an uncoupling direction.

6. In a vehicle, the combination of a frame, a coupler longitudinally movable relative to said frame into coupled and uncoupled positions, means for locking said coupler in its coupled position, and means for preventing accidental release of said locking means, said last-named means including a latch for operating said locking means.

7. In a vehicle, the combination of a frame, a coupler movable relative to said frame into coupled and uncoupled positions and comprising relatively movable members, and common means for locking said members in a coupled position and limiting movement thereof in an uncoupling direction.

8. In a vehicle, the combination of a frame, a coupler movable relative to said frame into coupled and uncoupled positions and comprising relatively movable members, and means cooperating with one of said members for locking said coupler in a coupled position, said means cooperating with another of said members for limiting movement of said coupler in an uncoupling direction.

9. In a vehicle, the combination of a frame, and a coupler movable relative to said frame and comprising pivotally mounted members, supporting guides for said members whereby one of said members has movement of translation only relative to said frame and the other of said members has movement of translation and rotation relative to said frame during movement of said coupler between coupled and uncoupled positions.

10. In a vehicle, the combination of a frame, a coupler movable relative to said frame and comprising pivotally connected members, supporting guides for said members whereby one of said members has movement of translation only relative to said frame and the other of said members has movement of translation and rotation relative to said frame during movement of said coupler between coupled and uncoupled positions, and means for limiting the movement of rotation of said last-mentioned coupler member.

11. In a vehicle, the combinaton, of a frame, a coupler movable relative to said frame and comprising pivotally connected members, supporting guides for said members whereby one of said members has substantial movement of translation only with respect to said frame during coupling and uncoupling and the other of said members has pivotal movement in relation to said first-named member during relative movement of said coupler with said frame.

12. A device for coupling vehicles comprising a depending member associated with one of said vehicles, a coupler for receiving said depending member, said coupler being slidable relative to the other of said vehicles between coupled and uncoupled positions, said coupler including members adapted to swing about a horizontal axis, means for locking said members in a coupled position, means for limiting movement of said coupler during uncoupling, and means for causing pivotal movement of one of said members in relation to the other whereby the same is movable out of the path of said depending member during uncoupling of said vehicles.

13. A device for coupling vehicles comprising a depending member associated with one of said vehicles, a coupler associated with the other of said vehicles for receiving said depending member, said coupler comprising pivotally connected members, one of said members being pivoted about the other out of the path of movement of said depending member during uncoupling of said vehicles.

14. A device for coupling vehicles comprising a depending member associated with one of said vehicles, a coupler associated with the other of said vehicles and movable relative thereto for receiving said depending member, said coupler comprising front and rear members pivotally connected to each other, and means for causing pivotal movement of said rear member relative to said front member during movement of said coupler between coupled and uncoupled positions.

15. A device for coupling vehicles comprising a depending member associated with one of said vehicles, a coupler associated with the other of said vehicles for receiving said depending member and slidable in respect to said last-named vehicle, said coupler comprising front and rear members pivotally connected to each other, and means for causing pivotal movement of said rear member relative to said front member upon sliding movement of said coupler during coupling and uncoupling of said vehicle.

16. A device for coupling vehicles comprising a depending member associated with one of said vehicles, a coupler associated with the other of said vehicles for receiving said depending member and slidable in respect to said last-named vehicle, said coupler comprising front and rear members pivotally connected to each other, and means for causing pivotal movement of said rear member relative to said front member upon sliding movement of said coupler during coupling and uncoupling of said vehicle, said means acting to move said rear member out of the path of said depending member during uncoupling and returning the same to coupled position with said front member when said front member is moved into coupled position by said depending member.

17. In a vehicle, the combination of a frame, a vehicle supporting member mounted thereon, a coupler reciprocatively supported by said member for movement to a plurality of positions, means for securing said coupler in said positions, means for cushioning said coupler on forward movement, and means for cushioning said coupler on rearward movement.

18. In a vehicle, the combination of a frame, a vehicle supporting member mounted thereon, a coupler movably mounted in said supporting member, means for locking said coupler in its coupled position and for limiting movement thereof in an uncoupling direction, and means for cushioning said coupler and locking means against shocks in a plurality of directions.

19. In a vehicle, the combination of a frame, a coupler movable relative to said frame, means for locking said coupler in its coupled position and for limiting movement thereof in an uncoupling direction, and means for cushioning said coupler and locking means against shocks in a plurality of directions.

20. In a vehicle, the combination of a frame, a vehicle supporting member, means for slidably mounting said member whereby the same may be elevated in respect to said frame, and a coupler mounted in said member.

21. In a vehicle, the combination of a movable coupler, means for cushioning said coupler, said means comprising a plurality of alternately arranged plate members having corrugated surfaces, and resilient members therebetween.

22. In a vehicle, the combination of a vehicle supporting member, a coupler movably mounted thereon, said coupler and member having oppositely disposed corrugated surfaces, and resilient members therebetween.

23. In a vehicle, the combination of a vehicle supporting member, a coupler movably mounted thereon, said coupler and member having oppositely disposed corrugated surfaces, and cushioning means for said coupler, said means comprising alternately arranged plate members and resilient members, said plate members having corrugated surfaces, a resilient member of said cushioning means being in association with the corrugated surfaces of said coupler and supporting member.

24. A coupler for a vehicle, comprising members having relative movement about a horizontal axis and having recess portions adapted to form a cavity when said members are closed, said members being provided with lateral flanges for slidably supporting the same.

25. A coupler for a vehicle, comprising members having relative movement about a horizontal axis and having recess portions adapted to form a cavity when said members are closed, said members being provided with transversely disposed lock engaging wall portions.

26. A coupler for a vehicle, comprising members having relative movement about a horizontal axis and being provided with recess portions adapted to form a cavity when the same are closed, and lateral flanges for slidably supporting said members, said members being provided with transversely disposed lock engaging wall portions.

27. In combination, a vehicle coupler comprising a king pin on one vehicle, a king pin receiving pocket movably mounted on the associated vehicle and consisting of front and rear portions pivoted to each other, resilient means for cushioning said pocket against shock in a plurality of directions, a pivoted lock for holding said pocket in a coupled position, and lock operating means including a rotating cam for moving said lock into its various operative positions, an associated lever arm, and a rod for operating said cam.

28. In combination, a vehicle coupler comprising a king pin on one vehicle, a king pin receiving pocket movably mounted on the associated vehicle and consisting of front and rear portions pivoted to each other, resilient means for cushioning said pocket against shock in a plurality of directions, a pivoted lock for holding said pocket in a coupled position, and lock operating means including a rotating cam for moving said lock into its various operative positions, an associated lever arm, and a rod provided with safety means to prevent accidental movement of said rod for operating said cam.

29. In combination, a vehicle coupler comprising a king pin on one vehicle, a resiliently mounted king pin receiving pocket on the associated vehicle and cushioning of front and rear portions pivoted to each other, a pivoted lock, and lock operating means including a rotating cam, normally acting to hold said lock in locked position and operable to raise and retain said lock in lock-set position, an associated lever arm and safety operating rod for operating said lock operating means and for preventing accidental movement of the same.

30. In combination, a vehicle coupler comprising a king pin on one vehicle, a resiliently mounted king pin receiving pocket on the associated vehicle and consisting of front and rear portions pivoted to each other, a pivoted lock, and lock operating means including a rotating cam, normally acting to hold said lock in locked position and operable to raise and retain said lock in lock-set position until released by forward movement of said front portion of said king pin receiving pocket as actuated by movement of said king pin, an associated lever arm and safety operating rod for operating said lock operating means and for preventing accidental movement of the same.

31. A device for coupling vehicles, comprising a king pin mounted on one of said vehicles, a coupler mounted on the other of said vehicles and adapted to receive said king pin, said coupler being movable as a unit relative to said vehicle between coupled and uncoupled positions, said coupler comprising elements relatively movable about a horizontal axis during movement of said coupler when uncoupling to permit unobstructed passage of said king pin from said coupler.

32. A device for coupling vehicles, comprising a king pin associated with one of said vehicles, a coupler associated with the other of said vehicles and adapted to receive said king pin, said coupler being movable as a unit relative to said vehicle between coupled and uncoupled positions, said coupler comprising relatively movable coupling elements, and locking means for said coupler, said means engaging one of said elements when said coupler is in coupled position and engaging another one of said elements when said coupler is in uncoupled position for limiting movement of said coupler.

33. A device for coupling vehicles, comprising a king pin mounted on one of said vehicles, a coupler mounted on the other of said vehicles and adapted to receive said king pin, said coupler being movable as a unit relative to said vehicle between coupled and uncoupled positions, said coupler comprising elements relatively movable about a horizontal axis, one of said elements moving downwardly away from said king pin to permit uncoupling.

34. A device for coupling vehicles, comprising a king pin mounted on one of said vehicles, a coupler mounted on the other of said vehicles and adapted to receive said king pin, said coupler being movable as a unit relative to said vehicle between coupled and uncoupled positions, said coupler comprising elements relatively movable about a horizontal axis, means for locking said coupler in coupled position, and means for guiding one of said elements out of the path of said king pin upon release of said locking means and during movement of said coupler by said king pin to permit uncoupling.

35. A device for coupling vehicles, comprising a king pin mounted on one of said vehicles, a coupler mounted on the other of said vehicles and adapted to receive said king pin, said coupler being movable as a unit relative to said vehicle between coupled and uncoupled positions, said coupler comprising elements relatively movable about a horizontal axis, and means for guiding one of said elements out of the path of said king pin during uncoupling and for moving the same into its coupled position during movement of said coupler as a unit for uncoupling and coupling operations.

36. A device for coupling vehicles, comprising a king pin mounted on one of said vehicles, a coupler mounted on the other of said vehicles and adapted to receive said king pin, said coupler being movable as a unit relative to said vehicle between coupler and uncoupled positions, said coupler comprising elements relatively movable about a horizontal axis, means for guiding one of said elements downwardly away from said king pin to permit uncoupling and for moving said element into cooperative coupled engagement with said king pin to effect a coupling therewith, and means for locking said coupler.

37. In a tractor-trailer, the combination of a king pin depending from the trailer, a coupler mounted on the tractor and adapted to receive said king pin, said coupler being movable as a unit relative to said tractor by said king pin between coupled and uncoupled positions, said coupler comprising elements relatively movable about a horizontal axis, means for guiding one of said elements downwardly away from said king pin when said coupler is moved by said king pin to permit uncoupling and for moving said element into cooperative coupled engagement with said king pin when said coupler is moved thereby to effect a coupling, and means for locking said coupler.

38. In a tractor-trailer, the combination of a king pin depending from the trailer, a coupler mounted on the tractor and adapted to receive said king pin, said coupler comprising elements relatively movable about a horizontal axis, said coupler being movable as a unit upon engagement of said king pin with one of said elements during uncoupling and upon engagement of said king pin with the other of said elements during coupling, means for guiding said element when engaged by said king pin during uncoupling for moving the same out of the path of movement of said king pin and to guide the same into cooperative engagement with said king pin during coupling to effect a coupling with said king pin, and means for locking said coupler in coupled engagement with said king pin.

39. In a vehicle, the combination of a coupler movably mounted upon said vehicle, a lock for holding said coupler in its coupled position, and means engaging with said lock for moving said lock into an unlocked position and for holding said lock in a lock-set position whereby said coupler may be uncoupled at will, said means being released from its engagement with said lock upon movement of said lock by said coupler during uncoupling.

40. In a vehicle, the combination of a coupler including a movable coupling element, a lock for holding said coupler in its coupled position, and means engaging with said lock for moving said lock into an unlocked position and for holding said lock in a lock-set position whereby said coupler may be uncoupled at will, said means being released from its engagement with said lock upon movement of said lock by said coupling element during uncoupling.

41. In a vehicle, the combination of a coupler including a movable coupling element, a lock for holding said coupler in its coupled position, a latch engageable with said lock for holding said lock in a lock-set position permitting uncoupling at will, said latch being disengaged from said lock upon movement of said lock by said coupling element during uncoupling, and means for holding said lock in its locked position.

42. In a vehicle, the combination of a coupler including a movable coupling element, a lock for holding said coupler in its coupled position, a latch engageable with said lock for holding said lock in a lock-set position permitting uncoupling at will, said latch being disengaged from said lock upon movement of said lock by said coupling element during uncoupling, and means on said lock engaging said latch when said latch is in its normal locked position for holding said lock in its locked position.

43. In a vehicle, the combination of a coupler including a movable coupling element, a lock for holding said coupler in its coupled position, a latch engageable with said lock for holding said lock in a lock-set position permitting uncoupling at will, said latch being disengaged from said lock upon movement of said lock by said coupling element during uncoupling, means on said lock engaging said latch when said latch is in its normal locked position for holding said lock in its locked position, and means for holding said latch in its normal locked position.

44. In a vehicle, the combination of a fifth wheel, a coupler movably mounted on said fifth wheel, means for cushioning said coupler in one direction when in a coupled position, pivotally mounted locking means for holding said coupler in said coupled position, and means for cushioning said locking means whereby said coupler is cushioned in the other direction.

45. In a vehicle, the combination of a coupler including a movable coupling element, a lock engaging said element for holding the same in coupled position, a latch engageable with said lock for operating the same, means on said lock engaging said latch to hold said lock in locked position when said latch is in its locked position, and an operating rod connected to said latch for operating the same.

46. In a vehicle, the combination of a movable coupler for receiving a king pin comprising front and rear pivotally connected coupling elements, said rear element moving out of the path of said king pin during uncoupling, a lock for holding said coupler in a coupled position, means for operating said lock and for holding said lock in locked position, said means including a latch for holding said lock in lock-set position and out of the path of said rear coupling element whereby uncoupling may be effected at will, said rear coupling element being adapted to release said lock and latch from lock-set position upon uncoupling movement thereof, and means on said lock engaging said latch preventing return thereof to its normal lock holding position, said means upon movement of said lock into its normal locking position permitting return of said latch into said lock holding position and engaging therewith to prevent accidental unlocking of said lock.

47. In a vehicle, the combination of a movable coupler for receiving a king pin comprising front and rear pivotally connected coupling elements, said rear element moving out of the path of said king pin during uncoupling, a lock for holding said coupler in a coupled position, means for operating said lock and for holding said lock in locked position, said means including a latch for holding said lock in lock-set position and out of the path of said rear coupling element whereby uncoupling may be effected at will, said rear coupling element being adapted to release said lock and latch from lock-set position upon uncoupling movement thereof, means on said lock engaging said latch preventing return thereof to its normal lock holding position, said means upon movement of said lock into its normal locked position permitting return of said latch into said lock holding position and engaging therewith to prevent accidental unlocking of said lock, an operating rod for moving said latch, and means for holding said operating rod to prevent accidental movement thereof.

48. In a vehicle, the combination of a movable coupler for receiving a king pin comprising front and rear pivotally connected coupling elements, said rear element moving out of the path of said king pin during uncoupling, a lock for holding said coupler in a coupled position, means for operating said lock and for holding said lock in locked position, said means including a latch for holding said lock in lock-set position and out of the path of said rear coupling element whereby uncoupling may be effected at will, said rear coupling element being adapted to release said lock and latch from lock-set position upon uncoupling movement thereof, means on said lock engaging said latch preventing return thereof to its normal lock holding position, said means upon movement of said lock into its normal locking position permitting return of said latch into said lock holding position and engaging therewith to prevent accidental unlocking of said lock, an operating rod for moving said latch, and means for holding said operating rod to prevent accidental movement thereof, said means permitting movement of said rod in accordance with said latch between its lock-set and locked positions.

49. In a vehicle, the combination of a movable coupler for receiving a king pin comprising front and rear pivotally connected coupling elements, said rear element moving out of the path of said king pin during uncoupling, a lock for holding said coupler in a coupled position, means for operating said lock and for holding said lock in locked position, said means including a latch for holding said lock in lock-set position and out of the path of said rear coupling element whereby uncoupling may be effected at will, said rear coupling element being adapted to release said lock and latch from lock-set position upon uncoupling movement thereof, means on said lock engaging said latch preventing return thereof to its normal lock holding position, said means upon movement of said lock into its normal locking position permitting return of said latch into said lock holding position and engaging therewith to prevent accidental unlocking of said lock, an operating rod for moving said latch, and a latch for engaging said rod, said rod having a portion engaging said last-named latch permitting movement of said rod in accordance with said first-named latch between its lock-set and locked positions and providing a shoulder engaging with said last-named latch for holding said first-named latch in its locked position and to prevent accidental movement of said rod.

50. In a vehicle, the combination of a fifth wheel member, a coupler supported by said fifth wheel member and movable as a unit into a plurality of positions, said coupler comprising elements relatively movable about a horizontal axis, one of said elements being movable relative to the other about said horizontal axis when said coupler is being moved into one of said positions, and means for locking said coupler in any one of said positions.

51. In a vehicle, the combination of a fifth wheel member, a coupler supported by said fifth wheel member and movable as a unit into a plurality of positions, said coupler comprising elements relatively movable about a horizontal axis, means for effecting relative movement of said elements when said coupler is moved into one of said positions, and means for locking said coupler in any one of said positions.

52. In a unit comprising two vehicles, the combination of a king pin extending from one of said vehicles, a fifth wheel member connected to the other of said vehicles, a coupler supported by said fifth wheel member adapted to receive said king pin and movable as a unit into a plurality of positions by said pin, said coupler comprising elements relatively movable about a horizontal axis, and means for guiding one of said elements to effect movement thereof relative to the other of said elements about said horizontal axis when said coupler is being moved into one of said positions by said king pin.

53. In a unit comprising two vehicles, the combination of a king pin extending from one of said vehicles, a fifth wheel member connected to the other of said vehicles, a coupler supported by said fifth wheel member adapted to receive said king pin and movable as a unit into a plurality of positions by said king pin, said coupler comprising elements relatively movable about a horizontal axis, one of said elements being movable by said king pin relative to the other about said horizontal axis when said coupler is being moved into one of said positions, and means for locking said coupler in any one of said positions.

54. In a unit comprising two vehicles, the combination of a king pin extending from one of said vehicles, a fifth wheel member connected to the other of said vehicles, a coupler supported by said fifth wheel member adapted to receive said king pin and movable as a unit into a plurality of positions by said king pin, said coupler comprising elements relatively movable about a horizontal axis, means for effecting relative movement of said elements when said coupler is moved by said king pin into one of said positions, and means for locking said coupler in any one of said positions.

55. A device for coupling vehicles, comprising a member associated with one vehicle, a coupler comprising relatively movable coupling elements adapted to swing about a horizontal axis and adapted to receive said member, said coupling elements being movable as a unit relative to the other of said vehicles from a coupled to an uncoupled position, and means for locking said coupler in one of said positions.

EDMUND P. KINNE.

CERTIFICATE OF CORRECTION.

Patent No. 2,015,313. September 24, 1935.

EDMUND P. KINNE.

It is hereby certified that error appears in the printed specification of the above numbered patent requiring correction as follows: Page 10, first column, line 4, claim 29, for "cushioning" read consisting; and second column, line 16, claim 36, for "coupler" read coupled; and that the said Letters Patent should be read with these corrections therein that the same may conform to the record of the case in the Patent Office.

Signed and sealed this 5th day of November, A. D. 1935.

Leslie Frazer (Seal) Acting Commissioner of Patents.